(12) United States Patent
Lunner et al.

(10) Patent No.: US 11,375,322 B2
(45) Date of Patent: Jun. 28, 2022

(54) HEARING AID DETERMINING TURN-TAKING

(71) Applicant: Oticon A/S, Smørum (DK)

(72) Inventors: Thomas Lunner, Redmond, WA (US); Lars Bramsløw, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 16/804,873

(22) Filed: Feb. 28, 2020

(65) Prior Publication Data

US 2021/0274294 A1    Sep. 2, 2021

(51) Int. Cl.
*H04R 25/00* (2006.01)
*G06F 3/01* (2006.01)
*G10L 25/84* (2013.01)

(52) U.S. Cl.
CPC ........... *H04R 25/505* (2013.01); *G06F 3/013* (2013.01); *G10L 25/84* (2013.01); *H04R 2225/43* (2013.01)

(58) Field of Classification Search
CPC .............. H04R 25/505; H04R 2225/43; H04R 2225/41; H04R 2225/55; H04R 1/1083;
(Continued)

(56) References Cited

U.S. PATENT DOCUMENTS

| 2011/0208520 A1* | 8/2011 | Lee | G10L 25/78 704/233 |
| 2012/0183165 A1* | 7/2012 | Foo | H04R 25/50 381/314 |

(Continued)

FOREIGN PATENT DOCUMENTS

| EP | 3 107 314 A1 | 12/2016 |
| EP | 3 614 695 A1 | 2/2020 |
| JP | 2015-011355 A | 1/2015 |

OTHER PUBLICATIONS

Harrison, "Evaluating the Use of Steering a Hearing Aid in a Dynamic Multi-Talker Environment Using Body Signals", University of Glasgow, Masters in Biomedical Engineering, Jan. 2018, pp. 1-56.

(Continued)

*Primary Examiner* — Norman Yu
(74) *Attorney, Agent, or Firm* — Birch, Stewart, Kolasch & Birch, LLP

(57) ABSTRACT

The present application relates to a hearing aid adapted to be worn in or at an ear of a hearing aid user and/or to be fully or partially implanted in the head of the hearing aid user. The hearing aid may comprise an input unit for receiving an input sound signal from an environment of a hearing aid user and providing at least one electric input signal representing said input sound signal, an output unit for providing at least one set of stimuli perceivable as sound to the hearing aid user based on processed versions of said at least one electric input signal, a voice activity detector (VAD) configured to determine speech in the input sound signal, an own voice detector (OVD) configured to determine own voice of the hearing aid user in the input sound signal, a processing unit connected to said input unit and to said output unit and comprising signal processing parameters of the hearing aid to provide processed versions of said at least one electric input signal, a turn-taking determining unit configured to determine turn-taking behaviour of the hearing aid user, wherein the processing unit is configured to adjust said signal processing parameters based on the determined turn-taking behavior of the hearing aid user.

18 Claims, 2 Drawing Sheets

(58) Field of Classification Search
CPC ...... H04R 25/30; H04R 25/305; H04R 25/00; G10L 25/78; G10L 25/84; G10L 15/20; G06F 3/013
USPC ................ 381/312, 110, 317, 122, 23.1, 56; 704/246, 214
See application file for complete search history.

(56) References Cited

U.S. PATENT DOCUMENTS

| | | | | |
|---|---|---|---|---|
| 2012/0257036 | A1* | 10/2012 | Stenberg | G03B 31/00 348/78 |
| 2018/0146307 | A1* | 5/2018 | Petersen | H04R 25/407 |
| 2018/0359572 | A1 | 12/2018 | Jensen et al. | |
| 2020/0120433 | A1* | 4/2020 | Serman | H04R 25/505 |

OTHER PUBLICATIONS

Nellerman, et al, "The benefits and user experience of hearing aids controlled by eye gaze of the user"; Jan. 7, 2020; pp. 1-107: XP055824626; Retrieved from the internet: URL:https://projekter.aau.dk/projekter/files/320836834/Master_thesis_The_benefits_and_user_experience_of_hearing_aids_controlled_by_eye_gaze_of_the_user.pdf retrieved on Jul. 15, 2021.

* cited by examiner

HEARING AID DETERMINING TURN-TAKING

SUMMARY

The present application relates to a hearing aid adapted to be worn in or at an ear of a hearing aid user and/or to be fully or partially implanted in the head of the hearing aid user. The present application further relates to a hearing system comprising a first and a second hearing aid.

A Hearing Aid:

Current hearing aids are optimized to help hearing aid users to communicate (converse) in the best possible way in different acoustic settings. However, there is no information from the user to the hearing aid as to how well the hearing aid is supporting the hearing aid user: how good is the speech intelligibility, and/or how high is the listening effort in the current situation, what is the state of fatigue, and/or is the hearing aid user withdrawing from conversation or engaging?

Attempts have been tried to provide this type of information to the hearing aid, e.g. via physiological measures, such as with use of an Electroencephalography (EEG) sensor. However, they require extra specialized hardware, currently not available in hearing aids, and none is using direct behavioural measures of the hearing aid user.

Turn-taking is a term characterising the dynamic behaviour of a conversation or dialog between two persons. It is quantified by gaps or overlaps in the speech of the two persons when they are taking turns in the conversation. Research results indicate that this stimulus-response pattern depends on hearing loss of a hearing-impaired person and on the type of noise. The overlaps are decreasing and the gaps are increasing when one of the two conversating persons is hearing-impaired. Furthermore, the speech production rate is decreasing as the hearing-impaired person speaks more slowly. As the hearing aid user must put in more listening effort and may also become fatigued, the gaps increase further and the speaking rate drops further.

Accordingly, there is a need for a hearing aid and hearing system, which is configured to measure turn-taking and use it as a real-time speech outcome measure to modify hearing aid settings in real time.

In an aspect of the present application, a hearing aid adapted to be worn in or at an ear of a hearing aid user and/or to be fully or partially implanted in the head of the hearing aid user is provided.

The hearing aid may comprise an input unit for receiving an input sound signal from an environment of the hearing aid user and providing at least one electric input signal representing said input sound signal.

The input sound signal may comprise a speech component originating from one or more speech sound sources. The input sound signal may comprise sound comprising noise signal components. The noise signal components may arise from one or more noise sound sources. The electric input signal may represent sound in the environment of the hearing aid user.

The input unit may comprise an input transducer, e.g. a microphone, for converting the input sound signal to the electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise an output unit for providing at least one set of stimuli perceivable as sound to the hearing aid user based on processed versions of said at least one electric input signal.

The hearing aid may comprise an output unit for providing a stimulus perceived by the hearing aid user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise a voice activity detector (VAD) configured to determine speech in the input sound signal.

The VAD may be configured for repeatedly estimating whether or not, or with what probability, said at least one electric input signal, or a signal derived therefrom, comprises speech (a voice signal).

For example, a VAD may detect when speech is present in the input sound signal, by e.g. looking at synchronous modulation in multiple harmonic frequency bands.

Thereby, speech included in the at least one electric input signal may be enhanced.

The hearing aid may comprise an own voice detector (OVD) configured to determine own voice of the hearing aid user in the input sound signal.

The OVD may be configured to repeatedly estimate whether or not, or with what probability, said at least one electric input signal, or a signal derived therefrom, comprises speech originating from the voice of the hearing aid user.

The OVD may indicate that the at least one electric input signal, or a signal derived therefrom, originates from the voice of the hearing aid user, or originates from the voice of the hearing aid user with a probability above an own voice presence probability (OVPP) threshold value. For example, an OVD may detect own voice based on a proximity effect causing a small level difference between the hearing aid microphones.

A microphone system of the hearing aid may be adapted to be able to differentiate between a user's own voice and another person's voice and possibly from NON-voice sounds.

The hearing aid may comprise at least one processing unit.

The processing unit may be connected to said input unit.

The processing unit may be connected to said output unit.

The processing unit may comprise signal processing parameters of the hearing aid to provide processed versions of said at least one electric input signal.

The hearing aid may comprise a turn-taking determining unit.

The processing unit of the hearing aid may comprise the turn-taking determining unit.

The turn-taking determining unit may be configured to determine turn-taking behaviour of the hearing aid user.

The determining turn-taking behaviour of the hearing aid user may comprise determining gaps between speech of the hearing aid user and of another person. Determining gaps may be based on the speech determined by the VAD and the own voice determined by the OVD.

For example, based on the VAD and the OVD, gap(s) may be measured as the time segment between the time (T1) when both the VAD and the OVD detects speech and the time (T2) when only the VAD detects speech, that is T1 (VAD ON, OVD ON)-T2(VAD ON, OVD OFF).

The determining turn-taking behaviour of the hearing aid user may comprise determining overlaps between speech of the hearing aid user and of another person. Determining overlaps may be based on the speech determined by the VAD and the own voice determined by the OVD.

The determination of gaps may be averaged over a time segment/interval (e.g. 2, 3, 4 min or more) thereby resulting in median gaps to increase the certainty of the measured gaps.

Thereby, the turn-taking pattern of the conversation between the hearing aid user and another person may be determined.

The processing unit may be configured to adjust and/or correct said signal processing parameters based on the determined turn-taking behavior of the hearing aid user.

The processing unit may be configured to adjust and/or correct said signal processing parameters in real-time.

Adjusting and/or correcting said signal processing parameters may comprise adjusting and/or correcting gain (e.g. incl. providing a mask), noise reduction, enhancement (e.g. spectral shaping) and/or other signal processing related parameters.

For example, in case, based on the determined turn-taking behaviour, the listening effort of the hearing aid user is estimated to be high as the determined gaps are above a gap threshold (large turn-taking gaps e.g. >300 ms) and/or the speaking rate is below a speaking rate threshold (slow speaking rate e.g. <4 syll/s), the hearing aid (e.g. processing unit of hearing aid) may be configured to e.g. enable beamforming.

For example, in case, based on the determined turn-taking behaviour, the listening effort of the hearing aid user is estimated to be low as the determined gaps are below the gap threshold (small turn-taking gaps) and/or the speaking rate is above the speaking rate threshold (fast speaking rate), the hearing aid (e.g. processing unit of hearing aid) may be configured to e.g. lower the high-frequency gain.

Thereby, the turn-taking behaviour and/or patterns may be used to modify the hearing aid's signal processing parameters in real time.

The hearing aid may be configured to activate the turn-taking determining unit.

The hearing aid may be configured to activate the turn-taking determining unit when the VAD determines speech and the OVD determines the own voice of the hearing aid user in the input sound signal.

The hearing aid may be configured to deactivate the turn-taking determining unit.

The hearing aid may be configured to deactivate the turn-taking determining unit when the VAD does not determine speech and the OVD does not determine the own voice of the hearing aid user in the input sound signal for a first time interval, e.g. >2 s.

Thereby, the turn-taking determining unit may be activated only in situations where it is needed and otherwise be deactivated resulting in a reduced power consumption and use of processing power.

The hearing aid may comprise a modulation filter. The modulation filter may be configured to determine speaking rate of the hearing aid user.

Determining speaking rate of the hearing aid user may be done by calculating the envelope of the speech signals (determined by the VAD and the OVD) followed by low-pass filtering the speech signal at 15 Hz, thereby resulting in a modulation spectrum. The peaks in the determined modulation spectrum relating to own voice of the hearing aid user may thereby be analysed to determine the speaking rate of the hearing aid user (typically 4-5 Hz).

Thereby, a simplified speaking rate determination and an augmented turn-taking determination is provided.

The hearing aid may further comprise a signal-to-noise ratio (SNR) estimator. The SNR estimator may be configured to determine SNR in the environment of the hearing aid user. The SNR may be determined based on the input sound signal and/or based on the processed versions of the at least one electric input signal.

The hearing aid may be configured to deactivate (turn off) the turn-taking determination unit when the SNR is below a first SNR threshold, e.g. <−3 dB.

Thereby, power consumption is reduced.

The hearing aid may further comprise a sound pressure level (SPL) estimator.

The SPL estimator may be configured to measure the level of sound at the input unit (e.g. at the input transducer).

The SPL estimator may be configured to measure the SPL at an ear canal microphone.

The SPL estimator may be configured to determine the SPL of the own voice and of another speaker to determine the difference in SPL between the speakers. This is another useful input for own voice vs other voice determination.

The hearing aid may further comprise a timer.

The timer may be configured to determine starting points in time of the turn-taking determination.

For example, the turn-taking determination may be initiated at discrete points in time.

For example, the turn-taking determination may be initiated at discrete points in time as long as the VAD and/or the OVD detects speech and own voice.

For example, the timer may be configured to determine time segments in which the turn-taking determination may take place.

The hearing aid may be configured to initiate the turn-taking determination unit when the timer is determining a starting point.

For example, when the timer determines a starting point in time of the turn-taking determination, the hearing aid (and/or the processing unit of the hearing aid) may be configured to activate the turn-taking determining unit, such as power on the turn-taking determining unit.

For example, when a time-segment determined by the timer ends, the hearing aid (and/or the processing unit of the hearing aid) may be configured to deactivate the turn-taking determining unit, such as power off the turn-taking determining unit.

For example, when the VAD and/or the OVD does not detect speech, the hearing aid (and/or the processing unit of the hearing aid) may be configured to deactivate the turn-taking determining unit, such as power off the turn-taking determining unit.

The timer results may be averaged over a longer time to achieve more reliable gap measurements.

Thereby, processing power and power consumption of the hearing aid is minimised.

The hearing aid may comprise a memory unit.

The memory unit may be configured to store reference signal processing parameters of the processing unit.

The processing unit may be configured to apply the reference signal processing parameters when the OVD has not determined own voice for a second time segment, e.g. >10 s.

Reference signal processing parameters may refer to the individualised signal processing parameters provided to the processing unit of the hearing aid, when the hearing aid is initially handed over to the hearing aid user. Reference signal processing parameters may refer to said individualised signal processing parameters adjusted e.g. according to input from the hearing aid user during subsequent use of the hearing aid. For example, said individualised signal processing parameters may be adjusted by machine learning based on input from the user and/or on monitored user behaviour or preferences.

Reference signal processing parameters may refer to the optimal signal processing parameters of the hearing aid during normal use of the hearing aid.

The second time segment may be timed and/or determined by the timer. For example, the second time segment may be at least 5 seconds.

Thus, the hearing aid may quickly adjust the signal processing parameters to an already verified often preferred setting in case the hearing aid user is not in a turn-taking situation.

The hearing aid may comprise an accelerometer.

An accelerometer may be configured to detect a movement of the hearing aid user. An accelerometer may be configured to detect movement in a vertical and/or in a horizontal direction. An accelerometer may be configured to detect the movement and/or acceleration and/or orientation and/or position of the hearing aid.

For example, the accelerometer may sense own voice activity of the hearing aid user by e.g. detecting the fundamental frequency of own voice of the hearing aid user and/or by detecting the jaw movements due to the hearing aid user speaking.

For example, the accelerometer may pick up vibrations coming from the vocal chords of the hearing aid user (in the form of F0, also known as pitch).

The hearing aid may comprise an ear canal microphone.

An ear canal microphone may be placed in the ear canal of the hearing aid user and may record the own voice of the hearing aid user due to occlusion effect.

The hearing aid may comprise an accelerometer and an ear canal microphone.

The OVD may be configured to determine own voice of the hearing aid user based on the accelerometer.

The OVD may be configured to determine own voice of the hearing aid user based on the ear canal microphone.

The OVD may be configured to determine own voice of the hearing aid user based on the accelerometer and the ear canal microphone.

The OVD may comprise the accelerometer and/or the ear canal microphone.

The hearing aid may be configured to determine own voice of the hearing aid user based on the accelerometer and the ear canal microphone. For example, when the accelerometer detects a movement of the hearing aid user and the ear canal microphone picks up the user's own voice by means of occlusion, it may be determined that the hearing aid user is speaking.

Thus, an own voice detection with high certainty may be provided.

The hearing aid may comprise an inertial measurement unit.

An inertial measurement unit may refer to an electronic device configured to measure and report a specific force of the hearing aid user, an angular rate, and/or an orientation of the body of the hearing aid user. The inertial measurement unit may be configured to carry out said measure based on a combination of accelerometer(s), gyroscope(s), and/or magnetometer(s). The inertial measurement unit may be configured to follow head-movements/rotations of the hearing aid user.

Thus, the head-movements/rotations and attention of the hearing aid user may be used for determining the turn-taking behaviour of the user.

The hearing aid may be configured to transmit the determined turn-taking behaviour of the hearing aid user to a server device. The transmission may be partly or completely wired and/or wireless.

The server device may be configured to adjust the reference signal processing parameters of the hearing aid based on said turn-taking behaviour.

The server device may be configured to store the preferences of the hearing aid user in different turn-taking situations (e.g. provided by the hearing aid user via the hearing aid).

Server device may refer to a cloud server.

The hearing aid may be configured to transmit said determined turn-taking behaviour to a server device via an auxiliary device. Auxiliary device may refer to a mobile phone, a hearing aid docking station (e.g. charger unit), and/or a local server device (e.g. at the home of the hearing aid user) configured to transmit said determined turn-taking behaviour to a server device (e.g. via a network).

Thereby, the reference signal processing parameters of the hearing aid and/or user preferences may be easily restored if needed.

The hearing aid may be configured to receive the adjusted reference signal processing parameters from the server device.

The hearing aid may be configured to store the adjusted reference signal processing parameters on the memory unit of the hearing aid.

The hearing aid may be configured to receive said adjusted reference signal processing parameters whenever available and/or whenever the hearing aid is connected to the server device.

Thereby, the hearing aid may always be operated on optimal signal processing parameters (e.g. adjusted/fitted to user preferences).

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user.

The hearing aid may comprise a directional microphone system adapted to spatially filter sounds from the environment, and thereby enhance a target acoustic source among a multitude of acoustic sources in the local environment of the user wearing the hearing aid. The directional system is adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link is established between two devices, e.g. between an entertainment device (e.g. a TV) and the hearing aid, or between two hearing aids, e.g. via a third, intermediate device (e.g. a processing device, such as a remote control device, a smartphone, etc.). The wireless link is used under power constraints, e.g. in that the hearing aid may be constituted by or comprise a portable (typically battery driven) device. The wireless link is a link based on near-field communication, e.g. an inductive link based on an inductive coupling between antenna coils of transmitter and receiver parts. The wireless link may be based on far-field, electromagnetic radiation. The communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link is based on a standardized or proprietary technology. The wireless link is based on Bluetooth technology (e.g. Bluetooth Low-Energy technology).

The hearing aid and/or the communication device may comprise an electrically small antenna. An 'electrically small antenna' is in the present context taken to mean that the spatial extension of the antenna (e.g. the maximum physical dimension in any direction) is much smaller than the wavelength $\lambda_{Tx}$ of the transmitted electric signal. The spatial extension of the antenna is a factor of 10, or 50 or 100 or more, or a factor of 1000 or more, smaller than the carrier wavelength $\lambda_{Tx}$ of the transmitted signal. The hearing aid is a relatively small device. The term 'a relatively small device' is in the present context taken to mean a device whose maximum physical dimension (and thus of an antenna for providing a wireless interface to the device) is smaller than 10 cm, such as smaller than 5 cm. In the present context, 'a relatively small device' may be a device whose maximum physical dimension is much smaller (e.g. more than 3 times, such as more than 10 times smaller, such as more than 20 times small) than the operating wavelength of a wireless interface to which the antenna is intended (ideally an antenna for radiation of electromagnetic waves at a given frequency should be larger than or equal to half the wavelength of the radiated waves at that frequency). At 860 MHz, the wavelength in vacuum is around 35 cm. At 2.4 GHz, the wavelength in vacuum is around 12 cm. The hearing aid has a maximum outer dimension of the order of 0.15 m (e.g. a handheld mobile telephone). The hearing aid has a maximum outer dimension of the order of 0.08 m (e.g. a head set). The hearing aid has a maximum outer dimension of the order of 0.04 m (e.g. a hearing instrument).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor is located in the forward path. The signal processor is adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids comprise a digital-to-analogue (DA) converter to convert a digital signal to an analogue output signal, e.g. for being presented to a user via an output transducer.

The hearing aid, e.g. the input unit, and/or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively, or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level (L) detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a classification unit configured to classify the current situation based on input signals from (at least some of) the detectors, and possibly other inputs as well. In the present context 'a current situation' is taken to be defined by one or more of
a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids or other audio systems. Some other classic situations with feedback problems are telephony, public address systems, headsets, audio conference systems, etc. Adaptive feedback cancellation has the ability to track feedback path changes over time. It is based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The feedback control system may comprise a feedback estimation unit for providing a feedback signal representative of an estimate of the acoustic feedback path, and a combination unit, e.g. a subtraction unit, for subtracting the feedback signal from a signal of the forward path (e.g. as picked up by an input transducer of the hearing aid). The feedback estimation unit may comprise an update part comprising an adaptive algorithm and a variable filter part for filtering an input signal according to variable filter coefficients determined by said adaptive algorithm, wherein the update part is configured to update said filter coefficients of the variable filter part with a configurable update frequency $f_{upd}$. The hearing aid is configured to provide that the configurable update frequency $f_{upd}$ has a maximum value $f_{upd,max}$. The maximum value $f_{upd,max}$ is a fraction of a sampling frequency $f_{upd}$ of an AD converter of the hearing aid ($f_{upd,max} = f_s/D$).

The update part of the adaptive filter may comprise an adaptive algorithm for calculating updated filter coefficients for being transferred to the variable filter part of the adaptive filter. The timing of calculation and/or transfer of updated filter coefficients from the update part to the variable filter part may be controlled by the activation control unit. The timing of the update (e.g. its specific point in time, and/or its update frequency) may preferably be influenced by various properties of the signal of the forward path. The update control scheme is preferably supported by one or more detectors of the hearing aid, preferably included in a predefined criterion comprising the detector signals.

The hearing aid may further comprise other relevant functionality for the application in question, e.g. compression, noise reduction, etc.

A hearing device or aid may comprise a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising audio distribution. Use may be provided in a system comprising one or more hearing devices/aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method is furthermore provided by the present application. The method may comprise receiving an input sound signal from an environment of a hearing aid user and providing at least one electric input signal representing said input sound signal, by an input unit.

The method may comprise determining speech in the input sound signal, by a VAD.

The method may comprise determining own voice of the hearing aid user in the input sound signal, by an OVD.

The method may comprise determining turn-taking behaviour of the hearing aid user, by a turn-taking determining unit.

The method may comprise adjusting and/or correcting signal processing parameters based on the determined turn-taking behavior of the hearing aid user.

The method may comprise providing processed versions of said at least one electric input signal, by a processing unit.

The processing unit may be connected to said input unit.

The processing unit may be connected to an output unit.

The processing unit may comprise said adjusted signal processing parameters of the hearing aid.

The method may comprise providing at least one set of stimuli perceivable as sound to the hearing aid user based on the processed versions of said at least one electric input signal, by the output unit.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In an aspect, a hearing system (e.g. a binaural hearing aid system) comprising a first and a second hearing aid as described above is provided.

Each of the first and second hearing aid may include an antenna and a transceiver circuitry for establishing a communication link to the other hearing aid, and may thereby allow the exchange of information between the two hearing aids.

Each of the first and second hearing aids may be configured to communicate their determined turn-taking behaviour to the other hearing aid.

Each of the first and second hearing aids may be configured to determine a confidence level of the respective determined turn-taking behavior.

The processing unit of each of the first and second hearing aids may be configured to determine a confidence level. The processing unit of either the first or the second hearing aid may determine a confidence level.

Determining a confidence level may comprise comparing similar parameters of the turn-taking behavior determined by the respective first and second hearing aid.

Determining a confidence level may comprise determining respective deviations between said compared similar parameter.

Determining a confidence level may comprise comparing the determined deviations with respective thresholds.

For example, when the determined deviations are below said respective deviation thresholds, the confidence level of the parameters of the determined turn-taking behavior may be above a confidence threshold. A confidence level above a confidence threshold may be termed as acceptable and below the confidence threshold may be termed as unacceptable.

A parameter of the turn-taking behavior may refer to the determined gap between the own voice of the hearing aid user and the voice of the other person conversating with the hearing aid user. A parameter of the turn-taking behavior may refer to the determined overlap between the own voice of the hearing aid user and the voice of the other person conversating with the hearing aid user. A parameter of the turn-taking behavior may refer to the determined speaking rate of the hearing aid user.

When the determined confidence level is above a confidence threshold, then the processing unit may be configured to adjust the signal processing parameters of the hearing system (and of the processing unit of the first and/or the second hearing aid).

In a further aspect, a hearing system comprising a hearing aid as described above, in the 'detailed description of embodiments', and in the claims, AND one or more auxiliary devices is moreover provided.

The hearing system is adapted to establish a communication link between the hearing aid and the auxiliary device(s) to provide that information (e.g. control and status signals, possibly audio signals) can be exchanged or forwarded from one to the other.

The auxiliary device may comprise a remote control, a smartphone, a spectacles frame (goggles), or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The hearing system may further comprise infrared radiation (IR) sensors configured to monitor eye gaze of the hearing aid user.

The hearing system may comprise an auxiliary device comprising IR sensors configured to monitor eye gaze of the hearing aid user.

The hearing system may comprise a spectacles frame (e.g. goggles) comprising IR sensors configured to monitor eye gaze of the hearing aid user.

The determination of turn-taking behaviour of the hearing aid user may be further based on the monitoring of eye gaze of the hearing aid user, by the IR sensors.

Thereby, the determination of turn-taking behaviour of the hearing aid user may be further supported/augmented.

Monitoring the turn-taking behaviour of the hearing aid user by measuring head rotations (e.g. by the inertial measurement unit as described above) and eye gaze (e.g. by the IR sensors), may be important when attending to multiple talkers [1]. The temporal patterns of these signals may reflect the listening effort of the hearing aid user. Not only the latency, but also the detailed movement pattern, is different for normal-hearing and hearing-impaired listeners and may be used to assess listening effort, speech intelligibility, and speech comprehension.

This may be useful in following turn-taking behaviour of the hearing aid user when listening to two or more talkers in a scene. From the head rotations, it may be possible to follow the turn-taking of the hearing aid user towards different talkers, and thus enhance the acoustic solution, which does not distinguish between talkers.

Adjusting the reference signal processing parameters of the hearing aid based on said turn-taking behaviour (the acoustically, the head movement, and/or the eye gaze based solutions) may be carried out by machine learning (e.g. by training a neural network). The training may be carried out in the server device, in an auxiliary device, or in the hearing aid. Thereby, the training may be distributed to the server device and the hearing aid may receive a trained version of reference signal processing parameters.

The training may be carried out at least partly in the auxiliary device, such as a mobile device. Thereby, the training may be distributed at least partly to an external device and the hearing aid may receive a trained version of signal processing parameters.

As training a neural network may be computationally intensive, carrying out the training in the server device or in the auxiliary device may reduce the power consumption of the hearing aid.

For example, the training or at least part of the training may be carried out by a smartphone connected to the hearing aid or by the hearing aid itself. Thereby, the hearing aid may be configured to be trained during the initial production and fitting to the hearing aid user, but also after the user has received the hearing aid, without the hearing aid has to connect to a server or an auxiliary device, or at least only has to connect to a server or an auxiliary device at intervals.

The training may additionally be based on (logged) user-derived benefit measures such as program preference and/or direct rating of listening effort and/or speech comprehension. The total logged data may be uploaded to the server device and machine learning may be applied to generalize the patterns and optimize the estimation of listening effort and/or speech comprehension from the proposed types of turn-taking behavior.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP is configured to run on cellular phone, e.g. a smartphone, or on another portable device allowing communication with said hearing aid or said hearing system.

Definitions

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid). The hearing aid may comprise a speakerphone (comprising a number of input transducers and a number of output transducers), e.g. for use in an audio conference situation.

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
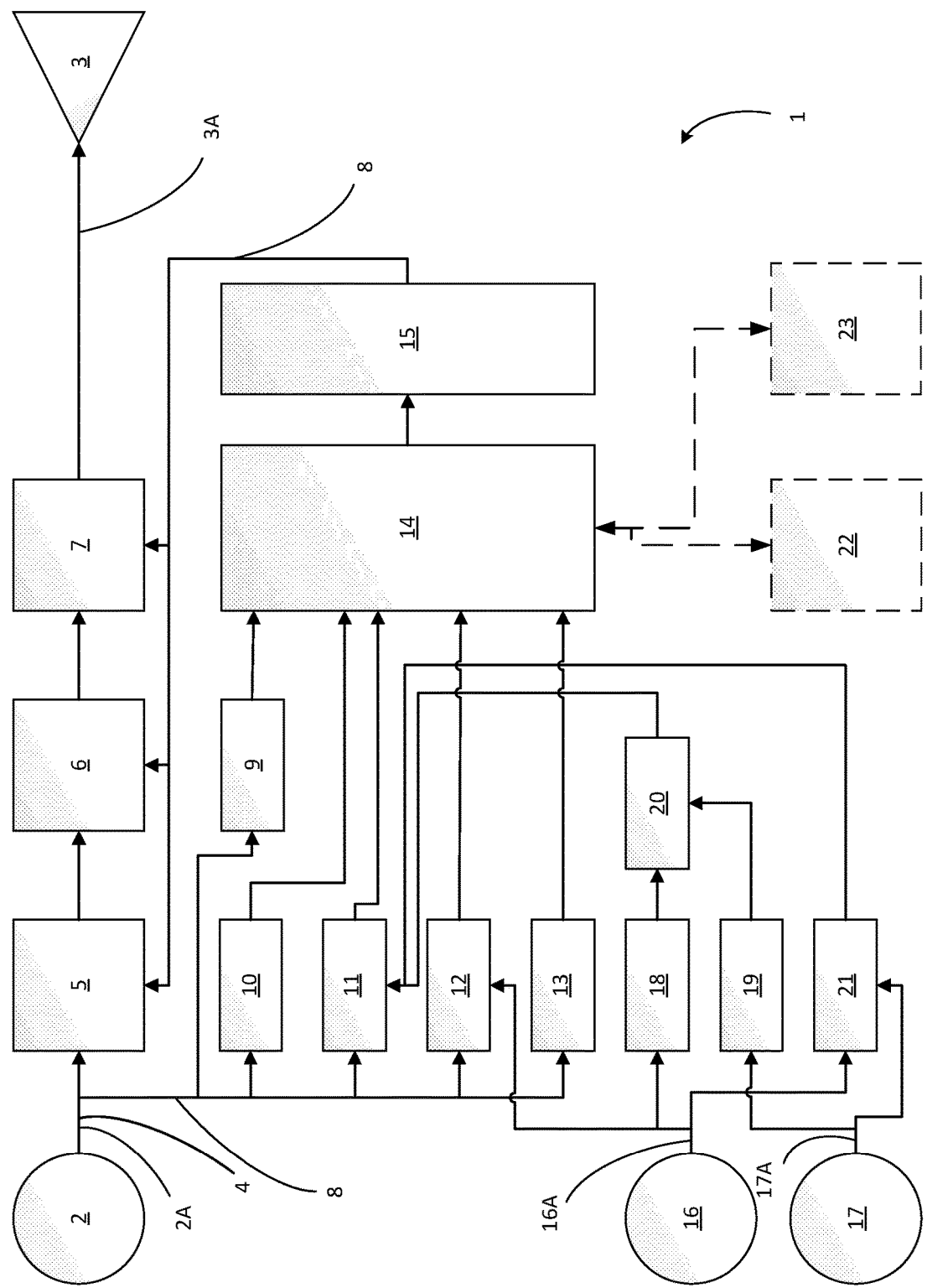
FIG. 1 shows an exemplary application scenario of a hearing aid according to the present disclosure.

FIG. 1 shows an exemplary application scenario of a hearing aid according to the present disclosure.

The hearing aid 1 of FIG. 1 is illustrated to comprise in input unit 2 and an output unit 3.

The input unit 2 may comprise one or more microphones for receiving an input sound signal from an environment of a hearing aid user and may provide at least one electric input signal 2A representing said input sound signal.

The output unit 3 may comprise one or more loudspeakers for providing at least one set of stimuli perceivable as sound to the hearing aid user based on processed versions of said at least one electric input signal 2A.

A forward or signal path 4 between the input unit 2 and the output unit 3 of the hearing aid 1 may comprise a first signal processor 5 (e.g. a digital signal processor), a hearing loss compensator unit 6, and a second signal processor 7. The first 5 and second signal processors 7 and the hearing loss compensator unit 6 may be configured to process (e.g. provide a frequency dependent gain, and/or a turn-taking behavior compensation) and provide a processed version 3A of said at least one electric input signal 2A to the output unit 3.

An analysis path 8 of the hearing aid 1 may comprise functional components for analyzing the electric input signal 2A (e.g. determining a level, a modulation, a type of signal, an acoustic feedback estimate, turn-taking, etc.).

The analysis path 8 may comprise a modulation filter 9, a VAD 10, an OVD 11, an SPL estimator 12, and/or an SNR estimator 13. Input from the modulation filter 9, the VAD 10, the OVD 11, the SPL estimator 12, and/or the SNR estimator 13 may be provided to a turn-taking determining unit 14 configured to determine turn-taking behaviour of the hearing aid user.

Based on the determined turn-taking behaviour of the hearing aid user, a hearing aid settings calculation unit 15 may calculate the corresponding required adjusted signal processing parameters.

The adjusted signal processing parameters may be provided to the first 5 and second signal processors 7 and the hearing loss compensator unit 6, so that the processed version 3A of said at least one electric input signal 2A may be provided to the output unit 3.

For example, the first signal processor 5 may determine the turn-taking patterns (gaps, speaking rate, etc.) and the second signal processor 7 may set the noise reduction, directionality, the gain, etc. as function of the first signal processor 5.

In FIG. 1, it is shown that the hearing aid 1 may additionally comprise an ear canal microphone 16 and an accelerometer 17.

The ear canal microphone 16 may receiving an input sound signal from the environment of a hearing aid user and may provide at least one electric input signal 16A representing said input sound signal.

The at least one electric input signal 16A of the ear canal microphone 16 may be provided to the SPL estimator 12 for measuring the level of sound at the ear canal microphone 16, e.g. the level of sound of the own voice and of another speaker e.g. to determine the difference in SPL.

The at least one electric input signal 16A of the ear canal microphone 16 may be provided to a first F0 (fundamental frequency) determining unit 18 for determining whether F0 of the own voice of the hearing aid user is present in the at least one electric input signal 16A.

A movement measure 17A detected by the accelerometer 17 may be provided to a second F0 determining unit 19 for determining whether F0 of the own voice of the hearing aid user is present in the movement measure 17A.

A comparing unit 20 may compare the F0 determined by the first 18 and second F0 determining units 19 to estimate whether the own voice of the hearing aid user is present in the input received by the ear canal microphone 16 and the accelerometer 17. The estimate may be provided to the OVD 11 to support the determination of own voice in the input sound signal.

Further, the at least one electric input signal 16A of the ear canal microphone 16 and the movement measure 17A detected by the accelerometer 17 may be provided to a correlation unit 21 for determining the correlation between the electric input signal 16A and the movement measure 17A. The correlation may be provided to the OVD 11 to support the determination of own voice in the input sound signal by indicating a higher cross correlation in the F0 range (100-200 Hz) when the user is speaking. It can also be a cross-spectrum of the two signals with a peak at F0 when speaking.

For example, the turn-taking determining unit 14 may determine turn-taking behaviour of the hearing aid user according to the following. Based on the VAD 10 and the OVD 11, gap(s) may be measured as the time segment between the time (T1) when both the VAD 10 and the OVD 11 detects speech and the time (T2) when only the VAD 10 detects speech, that is T1(VAD ON, OVD ON)-T2(VAD ON, OVD OFF). The measured gaps may be averaged over a time segment/interval (e.g. 2, 3, 4 min or more) thereby resulting in median gaps to increase the certainty of the measured gaps. Further, based on the modulation filter 9, the speaking rate of the hearing aid user may be determined as the peak of the corresponding modulation spectrum based on the power envelope, e.g. 0-20 Hz (measurement range) with a peak around 4-5 Hz corresponding to 4-5 syllables per second.

For example, typical values may be median gaps below 200 ms indicating easy condition (low listening effort) and median gaps above 300 ms indicating difficult conditions (high listening effort). Likewise, the spread in the distribution of the gaps may widen in case of difficult conditions (high listening effort). The gap(s) (the gap duration) is individual and an adaptive system may learn the behaviour of the hearing aid user as function of SNR to determine 'typical pattern' and thus decide when there is an 'atypical pattern' (e.g. by machine learning, by statistical analysis, etc.).

As illustrated in FIG. 1, optionally, the turn-taking behavior determined by a further hearing aid 22 of the hearing aid user, or from another hearing aid user's hearing aid 23 (e.g. the hearing aid of a user conversating with the hearing aid user) may be provided to the turn-taking determining unit 14, so that a confidence level of the respective determined turn-taking behavior may be determined. When the determined confidence level is above a confidence threshold, corresponding required adjusted signal processing parameters may be calculated and the signal processing parameters may be adjusted.

Figure 2:
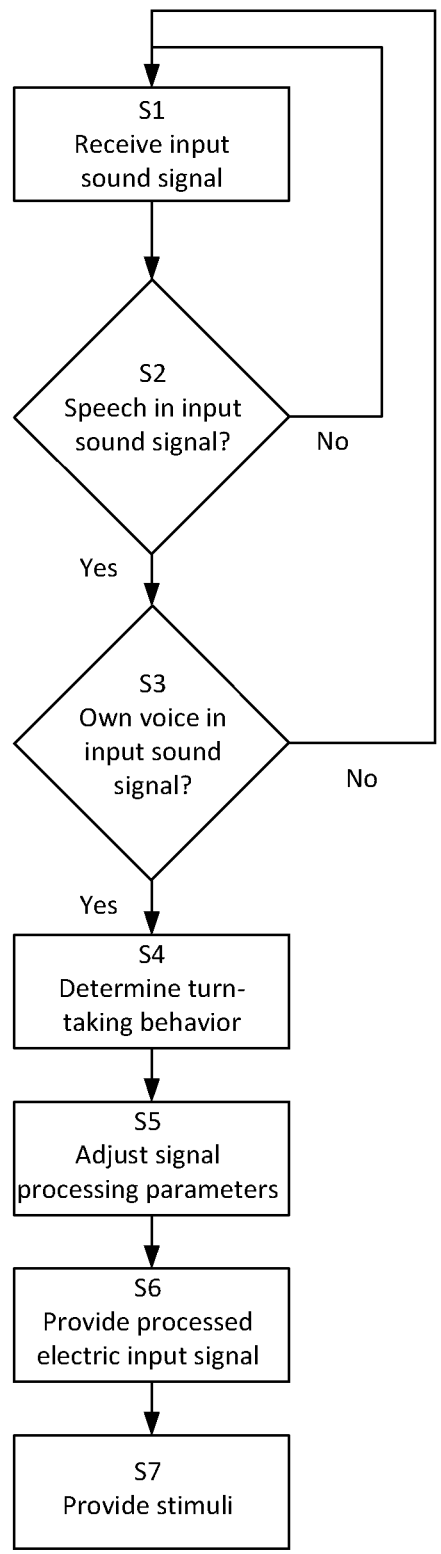
FIG. 2 shows an exemplary flow diagram of a method of determining turn-taking behavior of a hearing aid user.

FIG. 2 shows an exemplary flow diagram of a method of determining turn-taking behavior of a hearing aid user.

The method may comprise receiving S1 an input sound signal from an environment of a hearing aid user and providing at least one electric input signal representing said input sound signal, by an input unit.

The method may comprise determining S2 speech in the input sound signal. The determining S2 speech may be carried out by the VAD. When no speech is determined, the step of receiving S1 an input sound signal may be repeated.

When speech is determined, the method may comprise determining S3 own voice of the hearing aid user in the input sound signal. The determining S3 own voice may be carried out by the OVD. When no own voice is determined, the step of receiving S1 an input sound signal may be repeated.

When own voice is determined, the method may comprise determining S4 turn-taking behaviour of the hearing aid user. The determining S4 turn-taking behaviour may be carried out by the turn-taking determining unit.

The method may comprise adjusting S5 signal processing parameters based on the determined turn-taking behavior of the hearing aid user.

The method may comprise providing S6 processed versions of said at least one electric input signal. The providing S6 processed versions may be carried out by a processing unit connected to said input unit and to an output unit. The processing unit may comprise said adjusted signal processing parameters of the hearing aid.

The method may comprise providing S7 at least one set of stimuli perceivable as sound to the hearing aid user based on the processed versions of said at least one electric input signal. The providing S7 stimuli may be carried out by the output unit.

It is intended that the structural features of the aids/devices/systems described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] M. Harrison, "Evaluating the Use of Steering a Hearing Aid in A Dynamic Multi-Talker Environment Using Body Signals," University of Glasgow, 2018.

The invention claimed is:

1. A hearing system comprising:
   a first and a second hearing aids adapted to be worn in or at an ear of a hearing aid user and/or to be fully or partially implanted in the head of the hearing aid user, each of the first and second hearing aids including:
   an antenna and a transceiver circuitry for establishing a communication link to the other hearing aid, and thereby allowing the exchange of information between the two hearing aids,
   an input unit for receiving an input sound signal from an environment of the hearing aid user and providing at least one electric input signal representing said input sound signal, an output unit for providing at least one set of stimuli perceivable as sound to the hearing aid user based on processed versions of said at least one electric input signal, a voice activity detector (VAD) configured to determine speech in the input sound signal, an own voice detector (OVD) configured to determine own voice of the hearing aid user in the input sound signal, a processing unit connected to said input unit and to said output unit and comprising signal processing parameters of the hearing aid to provide processed versions of said at least one electric input signal, and a turn-taking determining unit configured to determine turn-taking behaviour of the hearing aid user, wherein the processing unit is configured to adjust said signal processing parameters based on the determined turn-taking behavior of the hearing aid user and determine a confidence level of the determined turn-taking behavior, and wherein each of the first and second hearing aids is configured to communicate their determined turn-taking behaviour to the other hearing aid, and to determine a confidence level of the respective determined turn-taking behavior.

2. Hearing system according to claim 1, wherein each hearing aid further comprises a modulation filter configured to determine speaking rate of the hearing aid user.

3. Hearing behavior according to claim 1, wherein each hearing aid further comprises a signal-to-noise ratio (SNR) estimator configured to determine SNR in the environment of the hearing aid user.

4. Hearing system according to claim 1, wherein each hearing aid further comprises a sound pressure level (SPL) estimator for measuring the level of sound at the input unit.

5. Hearing system according to claim 1, wherein each hearing aid further comprises a timer configured to determine starting points in time of the turn taking determination.

6. Hearing system according to claim 5, wherein each hearing aid is configured to initiate the turn-taking determination unit when the timer is determining a starting point.

7. Hearing system according to claim 1, wherein each hearing aid comprises a memory unit configured to store reference signal processing parameters of the processing unit, and wherein the processing unit is configured to apply the reference signal processing parameters when the OVD has not determined own voice for a second time segment.

8. Hearing system according to claim 1, wherein each hearing aid comprises an accelerometer and/or an ear canal microphone, and wherein the OVD is configured to determine own voice of the hearing aid user based on the accelerometer and/or an ear canal microphone.

9. Hearing system according to claim 1, wherein each hearing aid comprises an inertial measurement unit.

10. Hearing system according to claim 1, wherein each hearing aid is configured to transmit the determined turn-taking behaviour of the hearing aid user to a server device configured to adjust the reference signal processing parameters of the hearing aid based on the said turn-taking behaviour.

11. Hearing system according to claim 1, wherein each hearing aid is configured to receive the adjusted reference signal processing parameters from a server device and store the adjusted reference signal processing parameters on a memory unit.

12. Hearing system according to claim 1, wherein, when the determined confidence level is above a confidence threshold, then the processing unit is configured to adjust the signal processing parameters.

13. Hearing system according to claim 1, further comprising infra-red (IR) sensors configured to monitor eye gaze of the hearing aid user.

14. Method for determining a turn-taking behavior of first and second hearing aids in a hearing system, the method comprising establishing a communication link between the first and second hearing aids to allow the exchange of information between the two hearing aids, receiving an input sound signal from an environment of a hearing aid user and providing at least one electric input signal representing said input sound signal, by an input unit, determining speech in the input sound signal, by a voice activity detector (VAD), determining own voice of the hearing aid user in the input sound signal, by an own voice detector (OVD), determining turn-taking behaviour of the hearing aid user, by a turn-taking determining unit, adjusting signal processing parameters based on the determined turn-taking behavior of the hearing aid user, providing processed versions of said at least one electric input signal, by a processing unit connected to said input unit and to an output unit and comprising said adjusted signal processing parameters of each hearing aid, providing at least one set of stimuli perceivable as sound to the hearing aid user based on the processed versions of said at least one electric input signal, by the output unit, and determining a confidence level of the determined turn-taking behavior, by the processing unit, wherein each of the first and second hearing aids is configured to communicate their determined turn-taking behaviour to the other hearing aid, and to determine a confidence level of the respective determined turn-taking behavior.

15. Hearing system according to claim 2, wherein each hearing aid further comprising a signal-to-noise ratio (SNR) estimator configured to determine SNR in the environment of the hearing aid user.

16. Hearing system according to claim 4, wherein each hearing aid further comprising a signal-to-noise ratio (SNR) estimator configured to determine SNR in the environment of the hearing aid user.

17. Hearing system according to claim 2, wherein each hearing aid further comprising a sound pressure level (SPL) estimator for measuring the level of sound at the input unit.

18. Hearing system according to claim 3, wherein each hearing aid further comprising a sound pressure level (SPL) estimator for measuring the level of sound at the input unit.

* * * * *